3,642,688
STABILIZATION OF RIGID POLY(VINYL CHLORIDE)

Matthew Peter Di Giaimo, Old Bridge, N.J., assignor to American Cyanamid Company, Stamford, Conn.
No Drawing. Continuation-in-part of application Ser. No. 647,350, June 20, 1967, which is a continuation-in-part of application Ser. No. 386,383, July 30, 1964. This application Feb. 24, 1969, Ser. No. 801,787
Int. Cl. C08f 45/60, 45/62
U.S. Cl. 260—45.8 NZ          2 Claims

ABSTRACT OF THE DISCLOSURE

The stabilization of rigid poly(vinyl chloride) by incorporation therein of a stabilizer comprising (a) a phosporic triamide and (b) an ultraviolet light absorber, each of (a) and (b) being present in a concentration of 0.1 to 2.0% based on the weight of the rigid poly(vinyl chloride). In the preferred embodiments, a heat stabilizer is also used.

---

This application is a continuation-in-part of application Ser. No. 647,350, filed June 20, 1967, and now abandoned; which was, in turn, a continuation-in-part of application Ser. No. 386,383, filed July 30, 1964, and now abandoned.

This invention relates to the stabilization of rigid poly(vinyl chloride) against degradation by light and, in the preferred embodiments, against degradation by heat also. It relates further to the resulting stabilized rigid poly(vinyl chloride).

For convenience, "poly(vinyl chloride)" will be referred to throughout the specification as "PVC." As used in this application, the expression "rigid" PVC is intended to mean a vinyl chloride polymeric composition having no plasticizer. 'Rigid' PVC is to be distinguished from "flexible" PVC which is PVC containing a significant amount of plasticizer.

The sensitivity to light and heat of both flexible and rigid PVC compositions has been recognized and, to some extent, dealt with, by incorporating in the polymeric compositions to be stabilized, effective amounts of heat stabilizers and/or light stabilizers. Recently, the art of stabilizing PVC was advanced by the use, in combination, of members of a specific class of heat stabilizers and members of a specific class of light stabilizers. Thus, in U.S. Pat. 2,912,411, there is disclosed a means of stabilizing PVC compositions by the incorporation therein of a phosphoric amide (as a light stabilizer) and a conventional heat stabilizer (e.g., sodium carbonate, cadmium ricinoleate, or an organic epoxy hydrochlorophyl). While there is no definite statement in this patent by which it is expressly limited to the stabilization of flexible PVC, it is noted that, in the examples of this patent, the PVC is in all cases plasticized with dioctyl phthalate. An attempt to stabilize rigid PVC in accordance with this teaching leads to discouraging results. Without any plasticizer, heat-stabilized, rigid PVC responds only slightly to the stabilizing effect of the phosphoric triamide. Thus, rigid PVC (i.e., PVC without plasticizer) is made only a bit more light stable as compared with PVC having only the heat stabilizer alone. The increase in stability is only slight and hardly makes the addition of the extra component worth the expense.

TABLE I.—RIGID PVC

| Additive Name | Conc. (weight), percent | U.V. exposure hours for $\Delta Y.I.=15$ |
|---|---|---|
| Control | | (¹) |
| Organo-tin-mercaptide (Thermolite 31) ² | 2 | 130 |
| Organo-tin-mercaptide (Thermolite 31) and Hexamethylphosphoric triamide | 2<br>0.5 | 185 |

¹ Degrades on mill.
² A commercially available di-n-butyl tin bis(isooctyl mercapto acetate).

This particular light stabilizer, found to be very useful for plasticized PVC, is of only slight use in rigid PVC. In view of this finding, it is an object of the present invention to provide a stabilizing combination which is capable of increasing the stability to light of rigid PVC. It is a further object to provide the stabilized rigid PVC composition obtained by using the stabilizer of this invention.

These and other objects are accomplished herein with great effectiveness and in a surprisingly simple manner. In accordance with the present invention, rigid PVC which may contain a conventional heat stabilizer, is made stable to light by the addition of a light stabilizer having the following two components:

(1) A phosphoric triamide of the following formula:

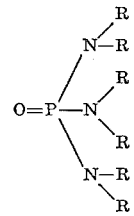

wherein the R radicals are the same or different lower-alkyl groups; or, alternatively, two R radicals on a single nitrogen may together form a polymethylene group (4 or 5 methylene groups) or an oxydiethylene group (resulting in a morpholino group); and (2) An ultraviolet light absorber.

It is indeed surprising that the stabilizer of this invention is as effective as it is since the phosphorous component by itself provides very little added stability to rigid PVC. The same phosphorous component along with an ultraviolet absorber provides a degree of stability which was not attainable with either component alone.

As suitable phosphoric triamides for use in this invention, there may be mentioned hexamethylphosphoric triamide, hexaethylphosphoric triamide, tris(pentamethylene) phosphoric triamide and tris(oxydiethylene)phosphoric triamide.

The ultraviolet absorbers which may be used in conjunction with the phosphoric triamide may be selected from the following classes of ultraviolet absorbers:

(A) 2-hydroxybenzophenones: Especially 2-hydroxybenzophenones with at least one additional substituent, for example 2-hydroxy-4-methoxybenzophenone,
2,4-dihydroxybenzophenone,
2,2'-dihydroxy-4-methoxybenzophenone,
2,2',4,4'-tetrahydroxybenzophenone,
2,2'-dihydroxy-4,4'-dimethoxybenzophenone, 2-hydroxy-4-butoxybenzophenone,
2-hydroxy-4-octoxybenzophenone,
2-hydroxy-4-dodecyloxybenzophenone,
2,2'-dihydroxy-4-octoxybenzophenone,
4'-chloro-2-hydroxy-4-octoxybenzophenone, etc.

This category of ultraviolet absorber is described in U.S. Pats. 2,777,838 issued Jan. 15, 1957; 2,682,559 issued June 29, 1954; 2,693,492 issued Nov. 2, 1954; 2,861,053 issued Nov. 18, 1958; 2,919,259 issued Dec. 29, 1959; 2,976,259 issued Mar. 21, 1961; 3,006,959 issued Oct. 31, 1961; and 3,098,842 issued July 23, 1963.

(B) Benzotriazoles: Especially the 2-(2-hydroxyphenyl)benzotriazoles such as 2-(2-hydroxy-5-methylphenyl)benzotriazole,
2-(2-hydroxy-5-octylphenyl)benzotriazole,
2-(2-hydroxy-4-methoxyphenyl)benzotriazole,
2-(2-hydroxy-3-t-butyl-5-methylphenyl)benzotriazole,
2-(2-hydroxy-3,5-di-t-butylphenyl)benzotriazole,
2-(2-hydroxy-3,5-di-t-butylphenyl)-5-chlorobenzotriazole,
2-(2-hydroxy-3-t-butyl-5-methylphenyl)-5-chlorobenzotriazole, etc.

This class of ultraviolet absorbers is described in U.S. Pats. 3,004,896 issued Oct. 17, 1961, 3,018,269 issued Jan. 23, 1962 and 3,271,339 issued Sept. 6, 1966.

(C) Aromatic esters: Phenyl salicylate, tertiary-butylphenyl salicylate, phenyl resorcylate, p-octylphenyl benzoate, bis(p-nonylphenyl) isophthalate, bis(p-nonylphenyl) terephthalate, etc. Such aromatic esters are typically described in U.S. Pat. 3,146,217 issued Aug. 25, 1964.

(D) Triazines: Especially triazines having at least one o-hydroxyphenyl substituent such as 2,4,6-tris(2-hydroxy-4-octyloxyphenyl)-s-triazine, 2-(2-hydroxy-4-octyloxyphenyl)-4,6-dixylyl-s-triazine, etc. Such triazines are described in U.S. Pats. 3,118,887, issued Jan. 21, 1964, 3,293,247 and 3,293,249, both of which issued Dec. 20, 1966.

(E) Benzothiazoles and benzothiazolines: 2-anilinobenzothiazole, 2-(N - methylanilino)benzothiazole, 2-(4-methoxyanilino)benzothiazole, 2 - (2 - methoxyphenylimino)-3-ethylbenzothiazoline, 2-phenylimino-3-ethylbenzothiazoline and 2-(β-naphthylimino)benzothiazoline, etc.

(F) Benzylidine-malonic esters: Diethyl p-methoxybenzylidenemalonate, diethyl o-methoxybenzylidenemalonate, diethyl p-hydroxybenzylidenemalonate, diethyl diphenylmethylenemalonate, etc. This specific class of ultraviolet absorbers is disclosed in copending application Ser. No. 389,210 filed Aug. 12, 1964. Additional ultraviolet absorbers of the benzylidene type are also disclosed in U.S. Pat. 3,244,668 issued Apr. 5, 1966.

(G) Arylaminoethylenes: Especially N-methyl-p-methoxyanilinomethylenemalonitriles such as diphenylaminomethylenemalononitrile and N-methyl-p-methoxyanilinomethylenemalononitrile. This class of ultraviolet absorbers is more fully disclosed in U.S. Pat. 3,079,366 issued Feb. 26, 1963.

(H) Guanidines: Especially 1,2-dibenzoyl-3-arylguanidines such as 1,2-dibenzoyl-3-(p-methoxyphenyl)guanidine; 1,2-dibenzoyl-3-(p-chlorophenyl)guanidine; 1,2-di-(p-methoxybenzoyl)-3-(p-methoxyphenyl)guanidine, etc. These ultraviolet absorbers are disclosed more fully in copending application Ser. No. 386,386 filed July 30, 1964.

(I) Cyanoacrylonitrile and cyanoacrylic acid derivatives: Especially aryl substituted compounds such as β-(diphenyl)-α-cyanoacrylic acid ethyl ester, β-(diphenyl)-α-cyanoacrylic acid octyl ester, α-phenylbenzylidenemalononitrile, diphenylbenzylidene-malononitrile, etc. This type of ultraviolet absorber is more fully disclosed in U.S. Pats. 3,074,971 issued Jan. 22, 1963; 3,085,097 issued Apr. 9, 1963; 3,111,417 issued Nov. 19, 1963; 3,149,146 issued Sept. 15, 1964; 3,215,724 issued Nov. 2, 1965 and 3,278,448 issued Oct. 11, 1966.

Any ultraviolet absorber can be used for the purposes of the present invention so long as it performs the functions generally required of an ultraviolet light absorber. These functions are well-known to be absorbency in the region of about 300–400 millimicrons, low absorbency above about 400 millimicrons, solubility in and compatibility with polymers and stability to light and heat. This invention is not limited to the use of the above-named types and embraces the use of all types of ultraviolet absorbers.

The amount of ultraviolet absorbers should be between 0.1 to 2.0%, preferably between 0.2 and 1.0%, based on the weight of the rigid PVC. The amount of phosphoric triamide to be used should be between 0.1 and 2.0%, preferably between 0.2 and 0.6%, based on the weight of the PVC. As will be noted, the phosphoric triamide concentration can be, and preferably should be, equal to the concentration of the ultraviolet absorber.

It should be noted that the invention also contemplates, in its preferred embodiments, the stabilization of PVC against degradation by both heat and light such as might be encountered during normal usage of articles manufactured from PVC. Other heat stabilizers may be necessary to prevent PVC from being degraded by high temperatures required for milling, molding and compounding the PVC if such are utilized. The heat stabilizers which are useful for this purpose can be any of the conventionally available types. While rigid PVC is always processed commercially in the presence of a heat stabilizer and the same types are useful herein in normally effective amounts, use of such heat stabilizers are not necessary to obtain the benefits of this invention. Most heat stabilizers are organo-metallic compounds. However, inorganic compounds such as sodium carbonate are also useful. Among the heat stabilizing organo-metallic compounds are the organo-tin compounds, dibutyl tin dimaleate, dibutyl tin dilaurate, dibutyl tin thioglycolic acid octyl ester, di-n-butyl tin bis(isooctyl mercapto acetate); the cadmium or barium salts (barium stearate, cadmium stearate, barium ricinoleate, cadmium ricinoleate, barium octylphenolate); and the organic hydrochlorophyl (acid acceptor) of the epoxy type (epoxidized soybean oil, methyl epoxystearates). A more complete listing of such heat stabilizers is disclosed in Chevassus et al., The Stabilization of Polyvinyl Chloride, Arnold Publ. Ltd., London (1963), pp. 343–374.

When used with a heat stabilizer, the light stabilizer of the present invention invention may be added as a whole to the rigid PVC or the components may be added separately. Generally, the heat stabilizer is the first to be put into the PVC, and the light stabilizer components are then incorporated into this blend by conventional milling procedures. After through blending, the PVC can then be shaped into a film or other article of manufacture by compression-molding, extrusion, injection-molding, calendaring, etc.

Other additives may be employed to modify the rigid PVC for the intended application. Among such additives are fillers, antistatic agents, pigments, dyes, etc.

The following examples, in which parts and percentages are on the basis of weight, are presented to further illustrate the present invention.

EXAMPLE 1

Films of 25-mil thickness are prepared from a PVC composition containing 2.0% of a commercial organo-tin-mercaptide (Thermolite 31) as heat stabilizer. The PVC contains no plasticizer. All but one of the film samples are treated with additional additives as shown below in Table II. The films are exposed to ultraviolet light using a fluorescent sunlamp-black-light (FS-BL) lamp. The exposure is continued until the tested sample shows a change in yellow index (Y.I.) of 15. This increase in yellow color is determined on a differential colorimeter ("Colormaster") using the following formula (see Example 8, U.S. Pat. No. 3,079,366):

$$\text{Yellow Index} = 70\left(1 - \frac{\text{Blue}}{\text{Green}}\right)$$

The following additives were used in this test:
Additive A—2-hydroxy-4-methoxybenzophenone.
Additive B—2 - (2-hydroxy-5-methylphenyl)benzotriazole.
Additive C—Tris(oxydiethylene)phosphoric triamide.

TABLE II

| Run No. | Additive Name | Percent | FS-BL exposure (hours) to ΔY.I. of 15 |
|---|---|---|---|
| 1 | None | | 170 |
| 2 | 2-hydroxy-4-methoxybenzophenone | 0.5 | 640 |
| 3 | 2-(2-hydroxy-5-methylphenyl)benzotriazole | 0.5 | 1,200 |
| 4 | Tris(oxydiethylene)phosphoric triamide | 0.5 | 190 |
| 5 | 2-hydroxy-4-methoxybenzophenone plus tris(oxydiethylene)phosphoric triamide | 0.5<br>0.5 | 1,410 |
| 6 | 2-(2-hydroxy-5-methylphenyl)benzotriazole plus tris(oxydiethylene)phosphoric triamide | 0.5<br>0.5 | 1,770 |

From Table II it can be noted that the tris(oxydiethylene)phosphoric triamide component by itself gave virtually no stability to rigid PVC over that resulting from the presence of the heat stabilizer in the PCV. It can also be noted that the individual ultraviolet light absorbers, while enhancing the stability of the rigid PVC to a large extent, did not approach the effectiveness of the combination stabilizer in accordance with the present invention.

Other ultraviolet absorbers of the classes outlined above can be substituted for the ultraviolet absorbers used in Example 1 with equal effectiveness. Likewise, tris(pentamethylene)phosphoric triamide could be used in place of Additive C with equivalent results.

EXAMPLE 2

Four films of 25-mil thickness are prepared from a poly(vinyl chloride) composition, rigid PVC homopolymer, containing a heat-stabilizing amount of a commercial organo-tin-mercaptide (Thermolite 31) heat stabilizer but no plasticizer. All but one of the films contained additional additives shown below:
Additive A—2-hydroxy-4-methoxybenzophenone.
Additive D—hexamethylphosphoric triamide.

The films are exposed to ultraviolet light using a fluorescent sunlamp-black-light (FS-BL) lamp, continuing the exposure until a given increase in yellow color develops. This increase in yellow color is defined as a change or increase in the Yellow Index (Y.I.) of 15 units. The Yellow Index is determined on a differential colorimeter.

The results are shown in Table III.

TABLE III

| No. | Additive Name | Percent | FS-BL exposure (hours) to ΔY.I. of 15 |
|---|---|---|---|
| 1 | None | | 130 |
| 2 | Hexamethylphosphoric triamide | 0.5 | 250 |
| 3 | 2-hydroxy-4-methoxybenzophenone | 0.5 | 530 |
| 4 | Hexamethylphosphoric triamide plus 2-hydroxy-4-methoxybenzophenone | 0.5<br>0.5 | 1,070 |

Hexamethylphosphoric triamide and 2-hydroxy-4-methoxy benzophenone alone extend the exposure time to a ΔY.I. of 15 by 120 hours and 400 hours, respectively. Used together, it might be expected that about 520 hours of extension would be obtained. Actually, 940 hours of extension is found.

This example shows the advantages obtained by combining a heat stabilizer, a phosphoric triamide and an ultraviolet absorber of the benzophenone type. Other benzophenone ultraviolet absorbers, such as 2-hydroxy-4-octyloxybenzophenone, 2-hydroxy-4-dodecyloxybenzophenone and 2,2'-dihydroxy-4-methoxybenzophenone can be employed with similar effectiveness.

EXAMPLE 3

Four chips of 50-mil thickness are prepared from the composition used in Example 2. The chips are exposed to sunlight (outdoor) for 3- and 6-month periods. The change in the Yellow Index is then determined. The results are shown in Table IV.

TABLE IV

| No. | Additive Name | Percent | Initial yellow index | ΔYellow index 3 months | ΔYellow index 6 months |
|---|---|---|---|---|---|
| 1 | None | | 6 | 9 | 27 |
| 2 | Hexamethylphosphoric triamide | 0.5 | 6 | 2 | 17 |
| 3 | 2-hydroxy-4-methoxybenzophenone | 0.5 | 4 | 3 | 7 |
| 4 | Hexamethylphosphoric triamide<br>2-hydroxy-4-methoxybenzophenone | 0.5<br>0.5 | 7 | −2 | −1 |

EXAMPLE 4

Films are prepared by the general procedure of Example 2, using the amounts of additives shown in Table V.

The films are exposed to a FS-BL with the results shown in Table V.

TABLE V

| No. | Additive Name | Percent | FS-BLSL exposure (hrs.) to Y.I. of 15 |
|---|---|---|---|
| 1 | None | | 120 |
| 2 | Hexamethylphosphoric triamide | 0.5 | 170 |
| 3 | 2-hydroxy-4-methoxybenzophenone | 0.5 | 340 |
| 4 | 2-(2-hydroxy-5-methylphenyl)benzotriazole | 0.5 | 480 |
| 5 | N-methyl-p-methoxyanilinomethylenemalonitrile | 0.5 | 690 |
| 6 | 2-(2-methoxyphenylimino)-3-ethylbenzothiazoline | 0.5 | 480 |
| 7 | Diphenylmethylenemalonitrile | 0.5 | 420 |
| 8 | 2,4,6-tris(2-hydroxy-4-octyloxyphenyl)-s-triazine | 0.25 | 220 |
| 9 | Phenylsalicylate | 0.5 | 210 |
| 10 | p-Methoxybenzylidenemalonic acid, diethyl ester | 0.5 | 415 |
| 11 | Hexamethylphosphoric triamide<br>2-hydroxy-4-methoxybenzophenone | 0.5<br>0.5 | 1,080 |
| 12 | Hexamethylphosphoric triamide<br>2-(2-hydroxy-5-methylphenyl)benzotriazole | 0.5<br>0.5 | 1,210 |
| 13 | Hexamethylphosphoric triamide<br>N-methyl-p-methoxyanilinomethylenemalonitrile | 0.5<br>0.5 | 1,110 |
| 14 | Hexamethylphosphoric triamide<br>2-(2-methoxyphenylimino)-3-ethylbenzothiazole | 0.5<br>0.5 | 720 |
| 15 | Hexamethylphosphoric triamide<br>Diphenylmethylenemalonitrile | 0.5<br>0.5 | 1,100 |
| 16 | Hexamethylphosphoric triamide<br>2,4,6-tris(2-hydroxy-4-octyloxyphenyl)-s-triazine | 0.5<br>0.25 | 430 |
| 17 | Hexamethylphosphoric triamide<br>Phenyl salicylate | 0.5<br>0.5 | 400 |
| 18 | Hexamethylphosphoric triamide<br>p-methoxybenzylidenemalonic acid, diethyl ester | 0.5<br>0.5 | 850 |

By the representative ultraviolet absorbers used in the foregoing example, it can be seen that the advantages of the present invention are obtained using any of a wide variety of ultraviolet absorbers.

EXAMPLE 5

Films of 25-mil thickness are prepared from a poly(vinyl chloride) composition containing a heat-stabilizing amount of a commercial organo-tin-mercaptide heat stabilizer (Thermolite 31). All but one of the films contained additional additives as shown in Table VI.

TABLE VI

| No. | Additive Name | Percent | FS-BL exposure (hours) to ΔY.I. of 15 |
|---|---|---|---|
| 1 | None | | 120 |
| 2 | Hexamethylphosphoric triamide | 0.5 | 160 |
| 3 | 2-(2-hydroxy-5-methylpheny)benzotriazole | 0.5 | 590 |
| 4 | Tridecyl phosphite | 0.5 | 130 |
| 5 | Hexamethylphosphoric triamide | 0.5 | 1,940 |
|   | 2-(2-hydroxy-5-methylphenyl)benzotriazole | 0.5 | |
| 6 | Hexamethylphosphoric triamide | 0.5 | 2,800 |
|   | 2-(2-hydroxy-5-methylphenyl)benzotriazole | 0.5 | 2,800 |
|   | Tridecyl phosphite | 0.5 | 2,800 |

EXAMPLE 6

Five PVC films were prepared without any heat stabilizer present. One film was utilized as a control and had no additive present. A second film contained 1.0% of Additive D (hexamethylphosphoric triamide). The third and fourth films contained 0.5% and 1.0%, respectively, of Additive A (2-hydroxy-4-methoxybenzophenone). The fifth film (in accordance with the present invention) contained 0.5% of Additive D plus 0.5% of Additive A. Each film was compression molded directly from the homopolymer powder (after dry blending a portion of the powder with the appropriate additive or additives where used). The five films were then exposed to ultraviolet light using a fluorescent sunlamp-black-light (FS-BL) lamp for 75 hours and the change in yellow index was measured using a differential colorimeter ("Colormaster") as in Example 1. The results are shown below in Table VII.

TABLE VII

| Description | Initial Y.I. | ΔY.I. on exposure for 75 hours |
|---|---|---|
| Control—no additive | 4+ | 36 |
| PVC plus 1.0% Additive D | 4 | 35+ |
| PVC plus 0.5% Additive A | 4 | 15 |
| PVC plus 1.0% Additive A | 4 | 6+ |
| PVC plus 0.5% Additive D plus 0.5% Additive A | 4 | 7+ |

This example shows that, in the absence of a heat stabilizer, the phosphoric triamide alone produced no light stabilizing effect but that, when used in combination with an ultraviolet light absorber the greatly enhanced light stabilizing effect of the present invention was obtained.

In total, these examples clearly demonstrate the beneficial light stabilizing effect of the stabilizer combinations of the present invention in rigid PVC in the presence of and in the absence of heat stabilizers.

I claim:
1. Rigid poly(vinyl chloride) stabilized against the deteriorating effects of light by having incorporated therein a stabilizer comprising the following materials:
   (a) tris(oxydiethylene)phosphoric triamide; and
   (b) an ultraviolet absorber, said ultraviolet absorber being a compound which is characterized by absorbency of light in the region of 300–400 millimicrons and low absorbency of light above 400 and also by solubility in and compatibility with poly(vinyl chloride) and stability to light and heat each of said materials being present in a concentration of 0.1 to 2.0% based on the weight of the rigid poly(vinyl chloride).

2. The composition of claim 1 having incorporated therein a heat stabilizer.

References Cited

UNITED STATES PATENTS

| 2,912,411 | 11/1959 | Tamblyn et al. | 260—45.9 |
| 2,919,259 | 12/1959 | Naylor et al. | 260—45.95 |
| 3,079,366 | 2/1963 | Boyle et al. | 260—45.9 |
| 3,118,887 | 1/1964 | Hardy et al. | 260—45.8 X |
| 3,214,436 | 10/1965 | Boyle et al. | 260—45.8 X |
| 3,215,724 | 11/1965 | Stroble et al. | 260—45.85 X |
| 3,244,668 | 4/1966 | Knapp et al. | 260—45.85 |

FOREIGN PATENTS

| 879,314 | 11/1953 | Germany | 260—45.9 |

OTHER REFERENCES

Chevassus et al., The Stabilization of Polyvinyl Chloride, St. Martin's Press, Inc., New York, 1963, pp. 165–169 and 306.

DONALD E. CZAJA, Primary Examiner

M. J. WELSH, Assistant Examiner

U.S. Cl. X.R.

260—23 XA, 45.7 R, 45.75 K; 45.8 N